(12) United States Patent
Lin

(10) Patent No.: US 9,164,248 B2
(45) Date of Patent: Oct. 20, 2015

(54) OPTICAL COMMUNICATION DEVICE

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/327,541

(22) Filed: Jul. 9, 2014

(65) Prior Publication Data

US 2015/0016787 A1    Jan. 15, 2015

(30) Foreign Application Priority Data

Jul. 9, 2013   (TW) .............................. 102124457 A

(51) Int. Cl.
*G02B 6/42*   (2006.01)
(52) U.S. Cl.
CPC ............ *G02B 6/4214* (2013.01); *G02B 6/4204* (2013.01); *G02B 6/4231* (2013.01)

(58) Field of Classification Search
CPC ......................... G02B 6/42144; G02B 6/4231
See application file for complete search history.

(56) References Cited

FOREIGN PATENT DOCUMENTS

WO    WO 2012079819 A1 *  6/2012

\* cited by examiner

*Primary Examiner* — Jerry Rahll
(74) *Attorney, Agent, or Firm* — Novak Druce Connolly Bove + Quigg LLP

(57) ABSTRACT

An optical communication device includes an optical fiber connector for positioning at least one optical fiber, a lens member for optically coupling the optical fiber with an photoelectric member, at least two metal engaging posts positioned on one of the optical fiber connector and the lens member, and at least two metal bushing members positioned on the other of the optical fiber connector and the lens member. The bushing members correspond to the engaging posts. Each bushing member defines an engaging hole for engaging with a corresponding engage post. The optical fiber connector is connected and aligned with each other by an engagement between the engaging posts and the bushing member.

8 Claims, 4 Drawing Sheets

OPTICAL COMMUNICATION DEVICE

FIELD

The present disclosure relates to communication devices, and particularly to an optical communication device.

BACKGROUND

An optical communication device generally includes an optical fiber connector for positioning an optical fiber(s) and a lens member for optically coupling the optical fiber with a photoelectric unit. One of the optical fiber connector and the lens member includes a number of engaging posts, and the other of the optical fiber connector and the lens member defines a number of engaging holes corresponding to the engaging posts. The optical fiber connector and the lens member are connected to each other by an engagement between the engaging posts and the engaging holes.

BRIEF DESCRIPTION OF THE DRAWING

The components of the drawing are not necessarily drawn to scale, the emphasis instead being placed upon clearly illustrating the principles of the embodiments of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
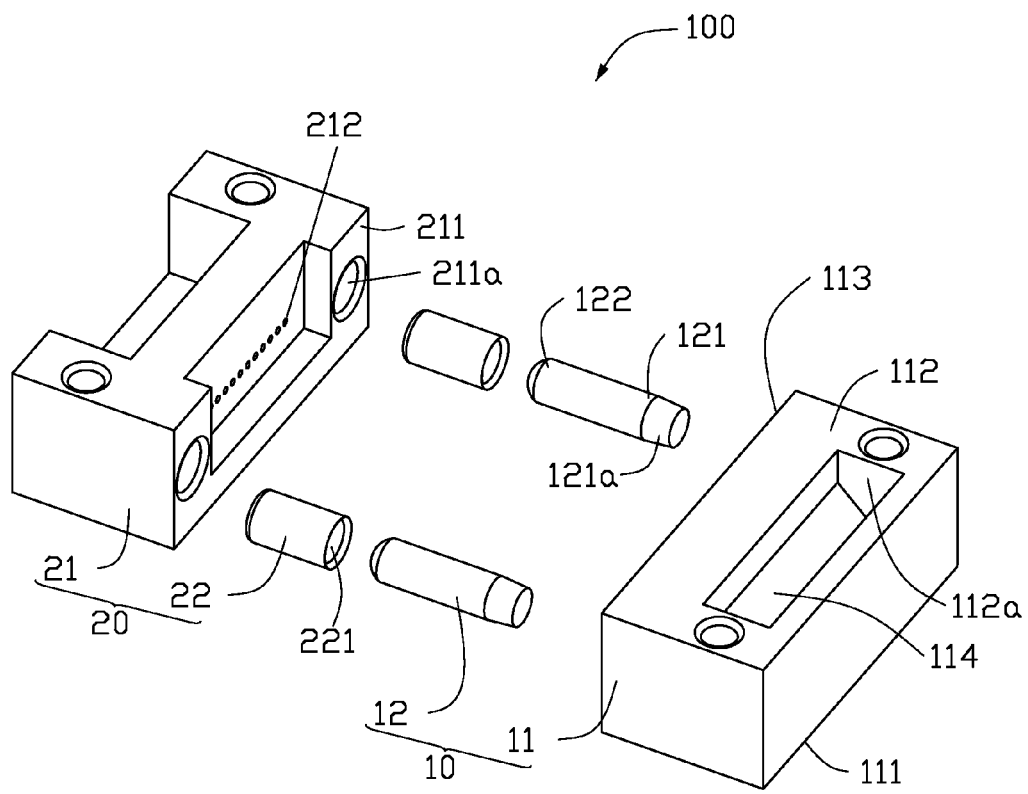
FIG. 1 is an exploded view of an embodiment of an optical communication device.
Figure 2:
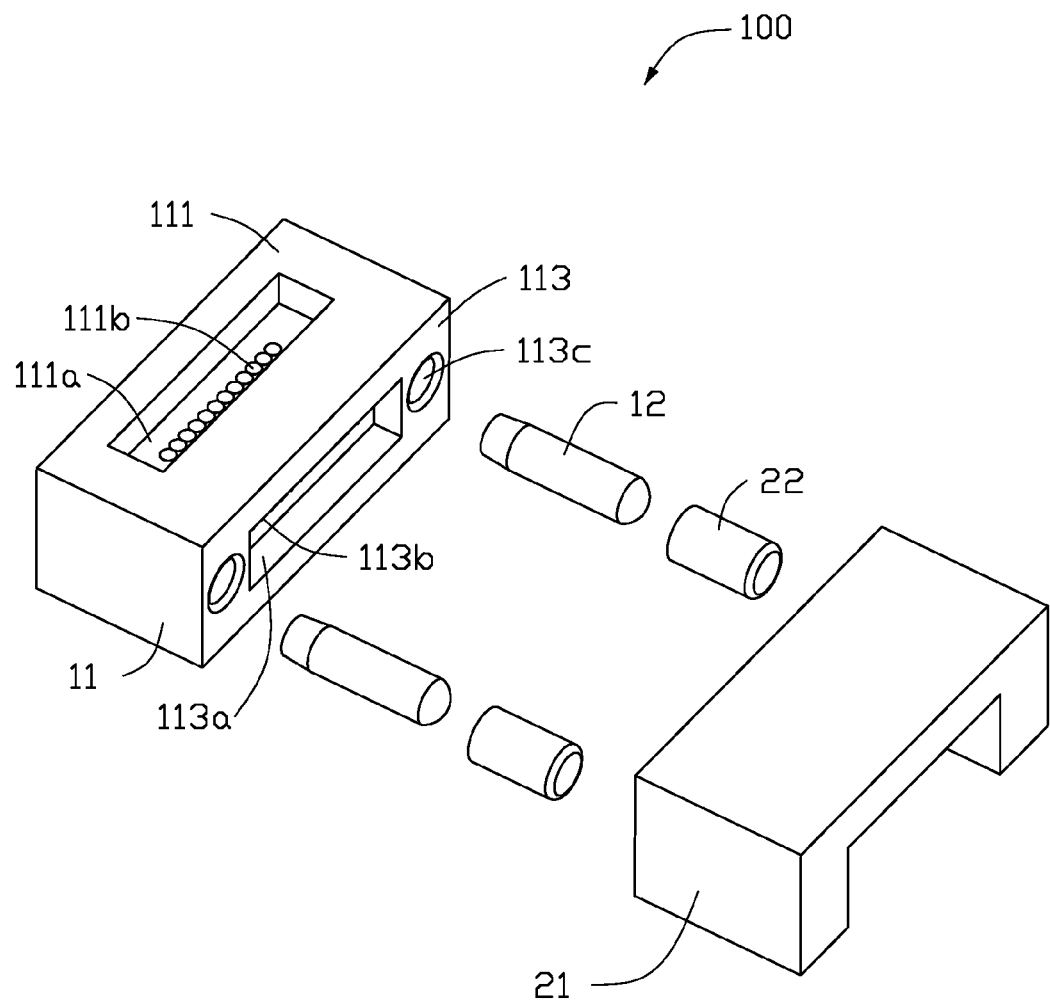
FIG. 2 is similar to FIG. 1, but viewed from another angle.

FIGS. 1-2 illustrate an embodiment of an optical communication device 100. The optical communication device 100 includes a lens member 10 and an optical fiber connector 20.

The lens member 10 includes first main body 11 and two engaging posts 12 connected to the first main body 11. The first main body 11 is substantially rectangular-shaped. The first main body 11 includes a bottom surface 111, a top surface 112 opposite to the bottom surface 111, a first end surface 113 facing toward the optical fiber connector 20, and a reflecting surface 114. In this embodiment, the bottom surface 111 is substantially parallel to the top surface 112, the first end surface 113 is substantially perpendicular to the bottom surface 111 and the top surface 112, and an angle between the bottom surface 111 and the reflecting surface 114 is substantially 45 degrees.

The first main body 11 defines a first groove 111a in the bottom surface 111. The first main body 11 includes a plurality of first lenses 111b on a bottom of the first groove 111a. In this embodiment, the first lenses 111b are arranged along a linear direction. In other embodiments, an arrangement of the first lenses 111b can be changed according to different requirements, for example, the first lenses 111b can be arranged as a matrix or a circle.

The first main body 11 defines a second groove 112a in the top surface 112. The reflecting surface 114 is formed in the second groove 112a.

The first main body 11 further defines a third groove 113a and two fixing holes 113c in the first end surface 113. The first main body 11 includes a number of second lenses 113b formed on a bottom of the third groove 113a corresponding to the first lenses 111b. The fixing holes 113c each correspond to an engaging post 12, and the fixing holes 113c are positioned at two opposite sides of the third groove 113a, respectively.

It is understood that, in other embodiments, the first groove 111a and the third groove 113a can be eliminated, and the first lenses 111b and the second lenses 113b can be directly formed on the bottom surface 111 and the first end surface 113, respectively.

In this embodiment, the first main body 11 is made of a plastic and is manufactured by an injection molding process.

The engaging posts 12 are made of a rigid metal with high wear resistant properties, such as iron and copper. Each engaging post 12 includes a fixing end 121 and an inserting end 122 connected to the fixing end 121. A tail of the fixing end 121 tapers along a direction away from the fixing end 121, thereby forming a tapered portion 121a. An end surface of the inserting end 122 is a convex surface.

The optical fiber connector 20 includes a second main body 21 and two bushing members 22 corresponding to the engaging posts 12. The second main body 21 is substantially rectangular-shaped. The second main body 21 includes a second end surface 211 facing toward the lens member 10. The second main body 21 defines two receiving holes 211a corresponding to the bushing members 22 and a plurality of through holes 212 corresponding to the second lenses 113b. Each of the through holes 212 is configured for receiving and fixing an end of a corresponding optical fiber (not shown) therein. The second main body 21 is made of a plastic and is manufactured by an injection molding process.

The bushing members 22 are made of a rigid metal with high wear resistant properties. In this embodiment, a material of the bushing members 22 is the same to that of the engaging posts 12. Each bushing member 22 defines an inserting hole 221 therein, for receiving the inserting end 122 of a corresponding engaging member 12.

Figure 3:
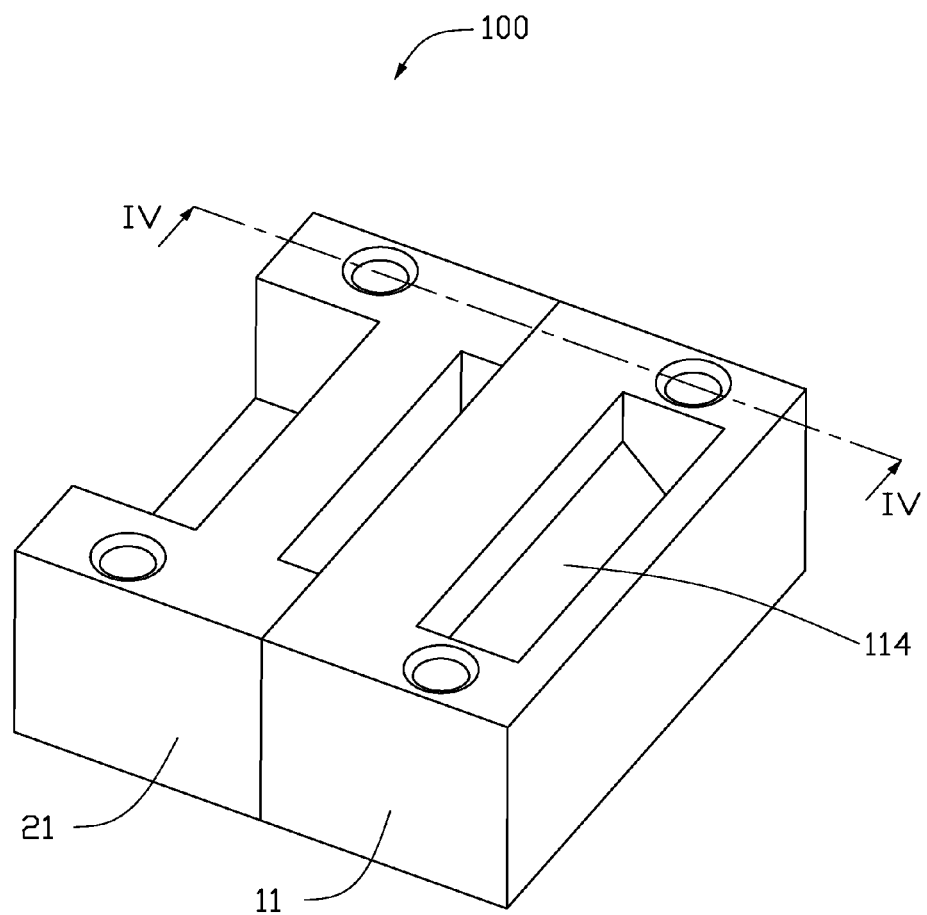
FIG. 3 is an assembled, isometric view of the optical communication device of FIG. 1.
Figure 4:
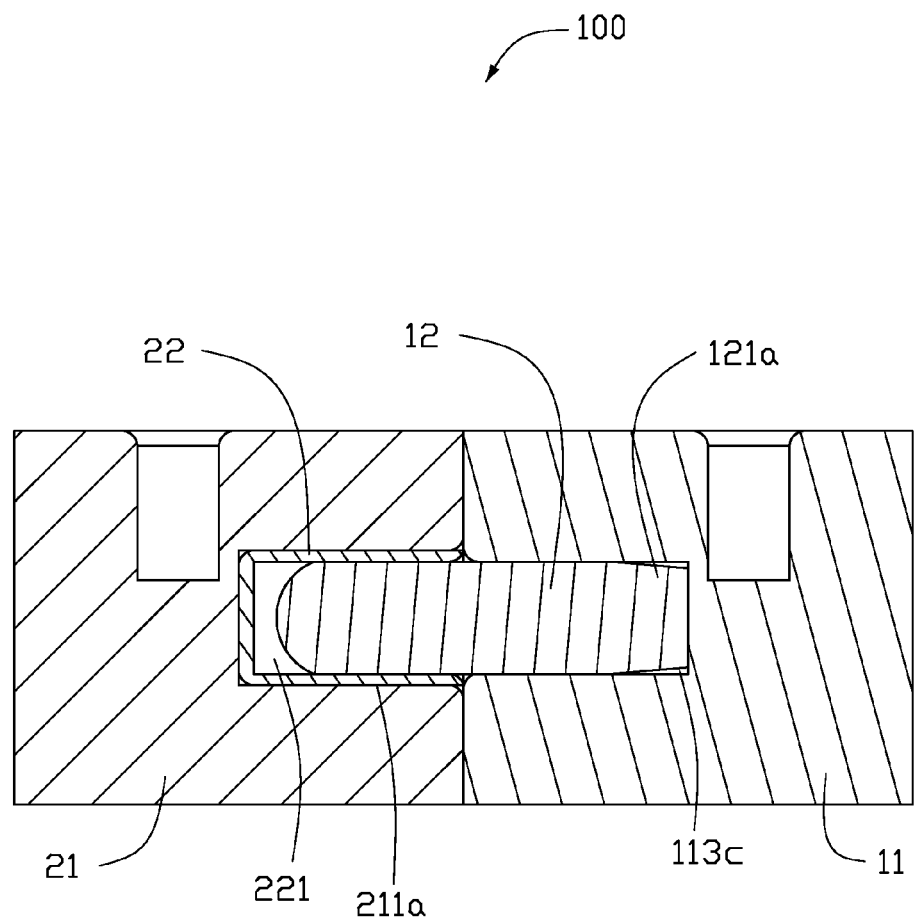
FIG. 4 is a cross-sectional view of the optical communication of FIG. 3, taken along line IV-IV.

FIGS. 3-4 illustrate the assembled optical communication device of FIGS. 1-2. In assembly, the fixing end 121 of each engaging post 12 is inserted and fixed in a corresponding fixing hole 113c. In this embodiment, each engaging post 12 is tightly fit with a corresponding fixing hole 113c. The tapered portion 121a ensures an easily inserting operation of a corresponding engaging post 12. The bushing members 22 are received and fixed in the receiving holes 211a, respectively. In this embodiment, each bushing member 22 is tightly fit with a corresponding receiving hole 211a. The inserting end 122 of each engaging post 12 inserts into a corresponding engaging hole 221 to connect the lens member 10 to the optical fiber connector 20. The second lenses 113b are aligned with the through hole 212, respectively. An optical axis of each second lens 113b passing through a central axis of a corresponding through hole 212.

In the above embodiment, the engaging posts 12 are positioned on the lens member 10, and the bushing members 22 are positioned on the optical fiber connector 20. Alternatively, the engaging posts 12 can be positioned on the optical fiber connector 20, and the bushing members 22 can be positioned on the lens member 10.

The optical communication device 100 connects the lens member 10 to the optical fiber connector 20 by an engagement between the engaging posts 12 and the bushing members 22. Because the engaging posts 12 and the bushing members 22 are made of a material with high wear resistant and high rigid characters, damage to the engaging posts 12 during an inserting operation can be avoided. Furthermore, wear of optical communication device 100 because of frequently inserting and separating operation between the lens member 10 and the optical fiber connector 20 can also be avoided, therefore, an assembling precision of the lens member 10 and the optical fiber connector 20 is ensured.

It is believed that the present embodiments and their advantages will be understood from the foregoing description, and it will be apparent that various changes may be made thereto without departing from the scope of the disclosure or sacrificing all of its material advantages, the examples hereinbefore described merely being exemplary embodiments of the disclosure.

What is claimed is:

1. An optical communication device comprising:
   an optical fiber connector configured to position at least one optical fiber;
   a lens member for optically coupling the optical fiber with a photoelectric member; and
   at least two metal engaging posts positioned on one of the optical fiber connector or the lens member; and
   at least two metal bushing members corresponding to the engaging posts, and being positioned on the other of the optical fiber connector or the lens member, each bushing member defining an engaging hole for engaging with a corresponding engage post, wherein the optical fiber connector being connected and aligned with each other by engagement between the engaging posts and the bushing member;
   wherein the lens member comprises a first main body, the first main body comprising a bottom surface, a top surface opposite to the bottom surface, a first end surface facing toward the optical fiber connector, and a reflecting surface for reflecting optical signals between the first end surface and the bottom surface, the optical fiber connector comprises a second main body, the second main body comprises a second end surface facing toward the lens member, the engaging posts are positioned on the first end surface, and the bushing members are positioned in the second end surface;
   wherein the first main body defines a first groove in the bottom surface, the first main body comprises at least one first lens on a bottom of the first groove;
   wherein the first main body defines a second groove in the top surface, the reflecting surface is formed in the second groove;
   wherein the first main body defines a third groove in the first end surface, and the first main body comprises at least one second lenses formed on a bottom of the third groove corresponding to the first lenses.

2. The optical communication device of claim 1, wherein the engaging post and the bushing member are made of a material selected from one of a group consisting of iron and copper.

3. The optical communication device of claim 1, wherein the second main body defines at least one through holes for receiving and fixing an end of the optical fiber therein.

4. The optical communication device of claim 1, wherein the first main body and the second main body is made of plastic.

5. The optical communication device of claim 1, wherein the first main body defines two fixing holes in the first end surface corresponding to an engaging post, and end of each engaging post is received and fixed in a corresponding fixing hole.

6. The optical communication device of claim 5, wherein each engaging post is tightly fit with a corresponding fixing hole.

7. The optical communication device of claim 1, wherein each engaging post comprises a fixing end and an inserting end connected to the fixing end, a tail of the fixing end tapers along a direction away from the fixing end.

8. The optical communication device of claim 7, wherein an end surface of the inserting end is a convex surface.

\* \* \* \* \*